Aug. 8, 1933.  G. J. McLEAN ET AL  1,921,535
DEVICE FOR FEEDING INFANTS
Filed Jan. 18, 1932
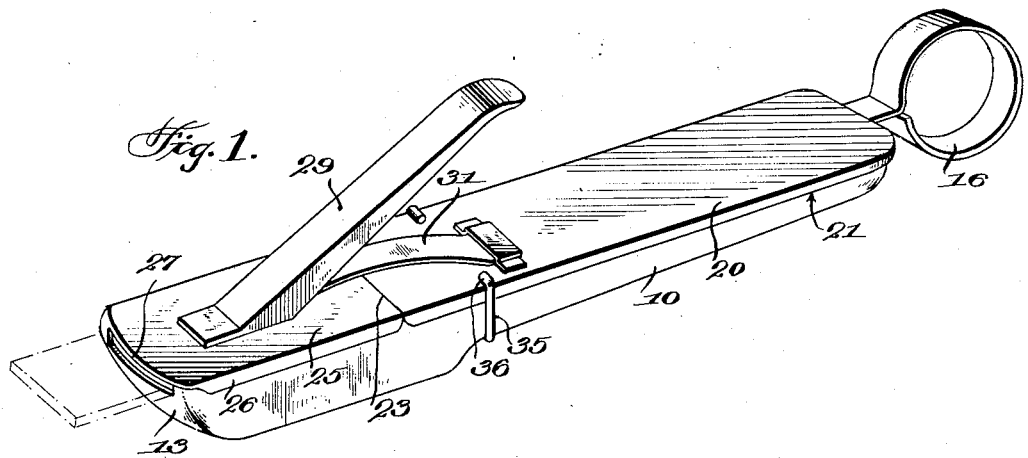
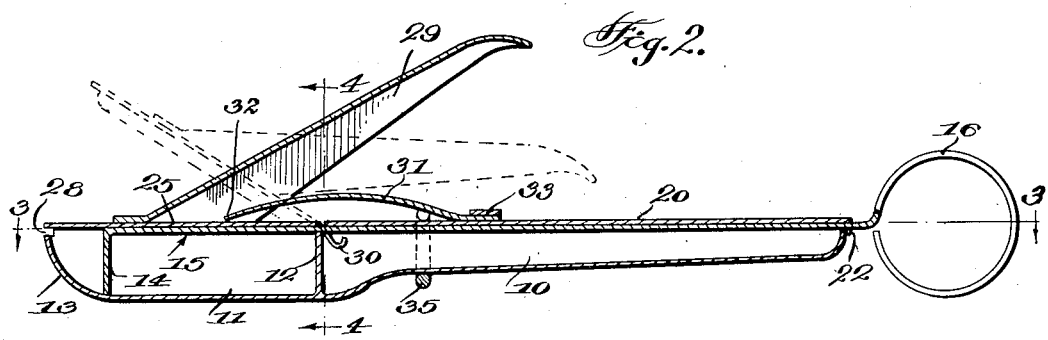
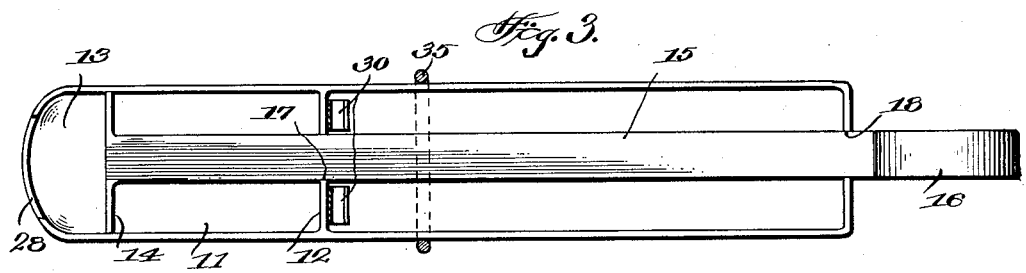
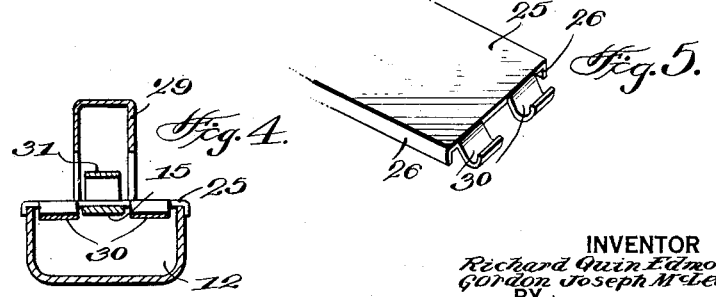
WITNESS
J. Markey
INVENTOR
Richard Quin Edmonson
Gordon Joseph McLean
BY
ATTORNEY Patented Aug. 8, 1933

1,921,535

UNITED STATES PATENT OFFICE 1,921,535

DEVICE FOR FEEDING INFANTS

Gordon J. McLean and Richard Q. Edmonson, New Orleans, La.

Application January 18, 1932. Serial No. 587,358

3 Claims. (Cl. 30—22)

This invention relates to a feeding device for infants.

An object of the invention is the provision of a device for feeding infants in which a chamber is provided having approximately the capacity of a teaspoon with a plunger operating in the chamber for forcing the food through a restricted opening at one end of the chamber in a substantially flat thin ribbon.

A further object of the invention is the provision of a feeding device having a handle with a chamber at one end forming a storage space for food and an operating rod slidably mounted in the handle, a cover plate being provided for the open end of the chamber and co-operating with the cut-out portion at the free end of the chamber to provide a restricted discharge orifice which will produce a thin ribbon of food for feeding the infant, all of the parts being readily removable so that they may be thoroughly washed and sterilized after the feeding device has been used.

This invention will be best understood from a consideration of the following detailed description, in view of the accompanying drawing forming a part of the specification; nevertheless, it is to be understood that the invention is not confined to the disclosure, being susceptible of such changes and modifications which shall define no material departure from the salient features of the invention as expressed in the appended claims.

In the drawing:

Figure 1 is a view in perspective constructed in accordance with the principles of our invention, Figure 2 is a longitudinal vertical section of the device, Figure 3 is a horizontal section taken along the line 3—3 of Figure 2, Figure 4 is a transverse vertical section taken along the line 4—4 of Figure 2, and Figure 5 is a view in perspective of the hinging end of a cover plate for the food chamber.

Referring more particularly to the drawing, 10 designates a handle which is hollow and made of any suitable material such as metal, bakelite, hard rubber, etc. Extending from the handle is a chamber 11 having an inner end wall 12 and an outer curved or tapering wall 13.

Slidably mounted in the chamber 11 is a plunger 14 which neatly fits the chamber transversely and to which is secured an operating rod 15 extending rearwardly and provided with a finger-piece 16 which extends beyond the outer free end of the handle 10. The partition 12 is provided with a cut-out portion 17 in which is mounted the operating rod 15. A slotted portion 18, similar to the cut-out portion 17, is provided in the outer free end of the handle 10 and the members 17 and 18 aid in guiding the rod 15 during the reciprocating movement of the plunger 14.

A cover plate 20 is provided with a peripheral flange 21 which engages the outer surfaces of the walls of the handle 10 adjacent the peripheral edge of the open end of the handle. The flange 21 at its rear end is cut out, as shown at 22, to receive the operating rod 15. The inner end of the plate 20 terminates at 23 approximately above the upper free edge of the partition 12.

A cover plate 25 is removably located upon the upper open end of the chamber 11 for closing said chamber after food has been placed therein. Flanges 26 project downwardly from the side edges of the plate 25 and embrace the side edges of the chamber 11. The inner free end of the cover plate 25 is in snug contact with the inner free end of the plate 20. The outer free end of the plate terminates at the upper free end of the curved wall 13 of the chamber 11 and is curved, as shown at 27, to conform to the slight curvature of the free end of the chamber 11. It will be noted that the upper edge of the front wall 13 of the chamber 11 is provided with a narrow slot 28 over which the free edge 27 of the plate 25 rests, thereby providing a transverse restricted discharge passage for the semi-solid or soft food which has been applied to the chamber 11 when the plunger 14 is operated for forcing food from said chamber.

A handle 29 is secured to the outer surface of the plate 25 and is U-shaped in cross section or channel-shaped, and is more particularly shown in Figs. 2 and 4. The member 29 is provided with a hand-grip for removing the cover 25 when desired. At the rear end of the cover plate 25 is provided curved lugs 30 which project downwardly and outwardly from the inner end of the plate and engage over the upper edge of the partition 12 to provide a hinging means for the lid or cover 25 while permitting removal of the lid from the chamber.

The spring member 31, formed of a flat strip of metal and curved, has its free end 32 normally engaging the cover plate 25 and is disposed between the side walls of the channel-shaped handle 29. This spring member is secured at 33 to the top plate 20. The spring member 31 is so constructed and arranged that it will exert sufficient pressure upon the cover plate 25 to maintain the same in position when the cover plate 20 has been secured in position on the handle 10.

A U-shaped member 35 embraces the handle 10 and has inturned lugs 36 adapted to engage over the top or cover 20. This U-shaped member is received by the reduced end of the handle 10 and is moved along the handle until it frictionally clamps the plate 20 to the handle 10.

The operation of our device is as follows: In order to place the feeding device in condition for operation the cover plate 25 is removed and the chamber is filled with a soft or semi-solid food, after the plunger 14 has been moved inwardly until it is in engagement with a partition 12. The capacity of the chamber 11 may vary but normally the chamber is constructed to store approximately the quantity which would fill a teaspoon in ordinary household use. The cover plate 25 is then placed in position with the free end 32 of the spring 31 pressing upon the plate 25 for maintaining it in position. It will be appreciated that it may not be necessary to remove the cover plate 25 when filling the chamber 11 since the handle 29 may be operated to the dotted line position shown in Fig. 2 and the device applied directly to the food in the same manner as a spoon is employed for filling the same with food.

After the device is in position for application of the food, the handle 10 is firmly grasped by the fingers while the index finger engages the ring or finger-piece 16 and the plunger 14 is forced outwardly, whereby a flat thin ribbon of food will be discharged from the passage 28. In this manner an infant may be fed more readily and gradually and the quantity given to the child can be determined in advance by the periodic stopping of the movement of the plunger 14.

We claim:

1. A device for feeding infants comprising a container having its upper face open, a supporting handle projecting from one end wall of the container, the other end wall of the container being inclined outwardly from the bottom to the top and provided with an elongated notch across the upper edge, a cover removably fitted on the upper open face with the outer free end of the cover co-operating with the notch to form a narrow slot, means for hingedly mounting the removably mounted cover means movable in the container for forcing food through the slot in a narrow ribbon, an operating means for the movable means, and means for removably supporting the operating means in the handle.

2. A device for feeding infants comprising a container, a hollow handle extending from the inner end of the container, the container and handle having their upper faces open, a cover for each open face, the outer end of the container having a slot through which food from the container is adapted to be forced, a plunger slidably mounted in the container, an operating rod connected to the plunger and slidably mounted in the handle, the cover for the handle retaining the rod in position, a spring carried by the cover for the handle and having a free end engaging the cover for the handle and having a free end engaging the cover for the container for maintaining said cover closed, means for hingedly mounting the cover for the container, means for retaining the cover for the handle in closed position so that the spring will retain the cover for the container closed, and means for opening the cover for the container.

3. A device for feeding infants comprising a container having the upper face open, a plunger slidably mounted in the container, a handle projecting from the inner end of the container, a cover for the container, means for removably hinging the cover to the inner end of said container, means for rocking the cover to expose the interior of the container, the handle being hollow and having the upper face open, a cover for the open face of the handle, an operating rod for the plunger slidably mounted in the handle, a spring connected to the cover for the handle and having a free end engaging the cover for the container, and means for removably securing the cover for the handle in position so that the hinge for the first-mentioned cover and the spring will retain the said cover in position.

GORDON J. McLEAN.
RICHARD Q. EDMONSON.